United States Patent [19]

Ash

[11] 4,434,010
[45] Feb. 28, 1984

[54] ARTICLE AND METHOD FOR FORMING THIN FILM FLAKES AND COATINGS

[75] Inventor: Gary S. Ash, Santa Rosa, Calif.

[73] Assignee: Optical Coating Laboratory, Inc., Santa Rosa, Calif.

[21] Appl. No.: 314,695

[22] Filed: Oct. 26, 1981

Related U.S. Application Data

[62] Division of Ser. No. 108,004, Dec. 28, 1979, abandoned.

[51] Int. Cl.$^3$ .............................................. C09C 1/64
[52] U.S. Cl. .................................................. 106/291
[58] Field of Search ................ 106/291; 428/402, 403

[56] References Cited

U.S. PATENT DOCUMENTS

| | | | |
|---|---|---|---|
| 3,071,482 | 1/1963 | Miller | 106/291 |
| 3,123,490 | 3/1964 | Bolomey et al. | 106/291 |
| 4,168,986 | 9/1979 | Venis | 106/291 |

*Primary Examiner*—James Poer
*Attorney, Agent, or Firm*—Flehr, Hohbach, Test, Albritton & Herbert

[57] ABSTRACT

Articles and methods for forming thin film flakes and replicated coatings having preselected optical properties. The articles generally comprise a flexible web of material and an optical coating formed on one surface of the web. Web materials having the characteristic of being soluble in a preselected liquid enable production of optical paint and optical paint flakes by dissolving the web away from the coating in a container of the liquid and enable the production of replicated optical coating by securing the coating to a substrate and then dissolving the web away from the coating.

7 Claims, 17 Drawing Figures

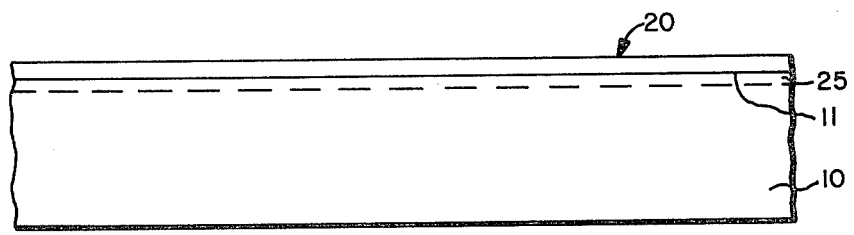
FIG.—1A
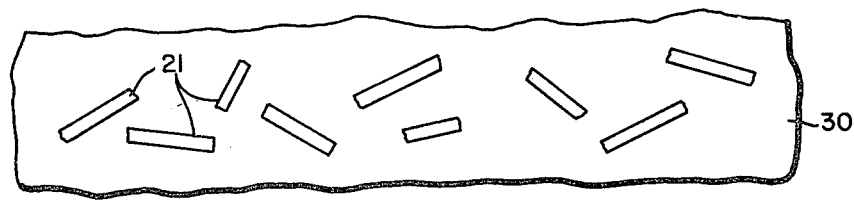
FIG.—1B
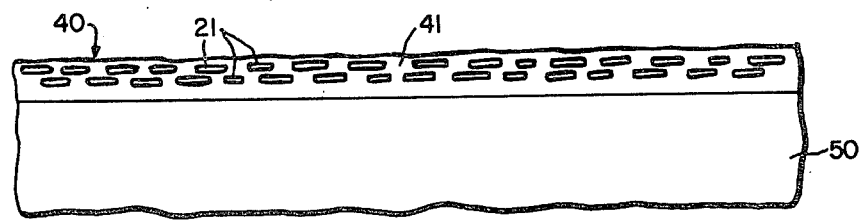
FIG.—1C
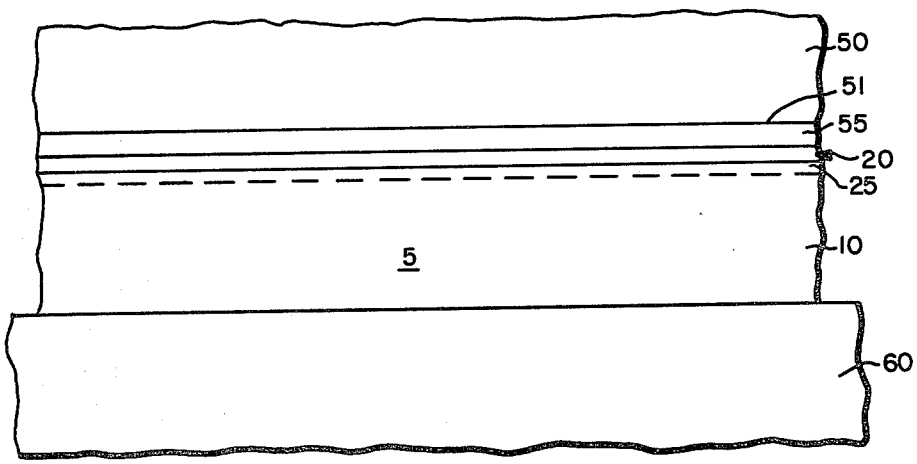
FIG.—1D

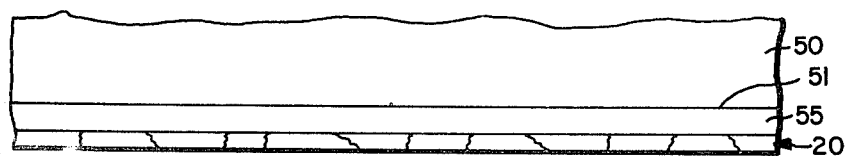
FIG.—IE
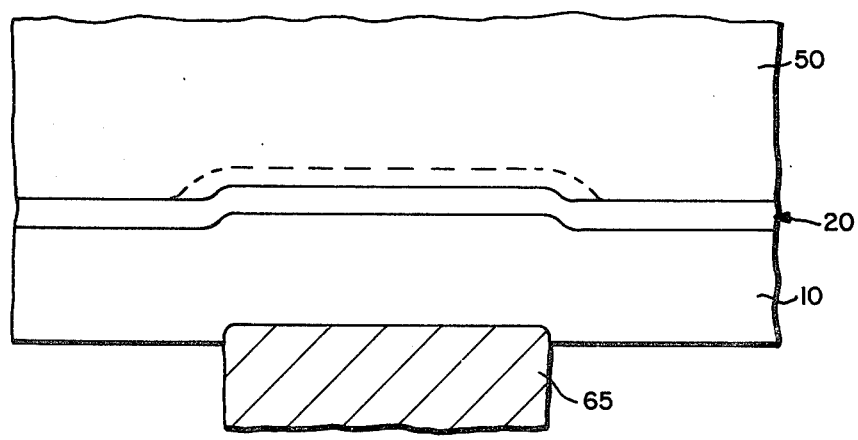
FIG.—IF
FIG.—IG

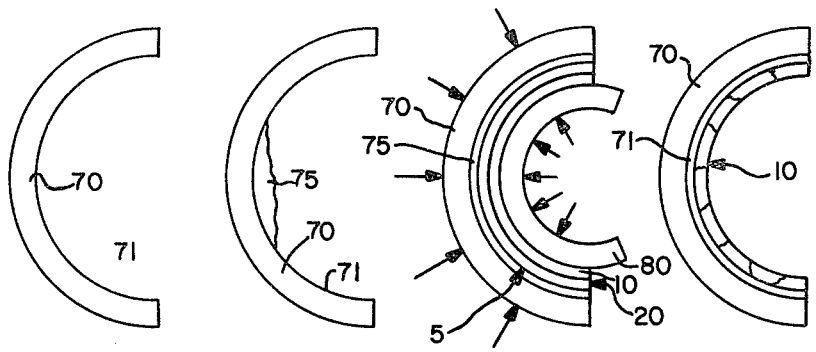
FIG.—2A  FIG.—2B  FIG.—2C  FIG.—2D
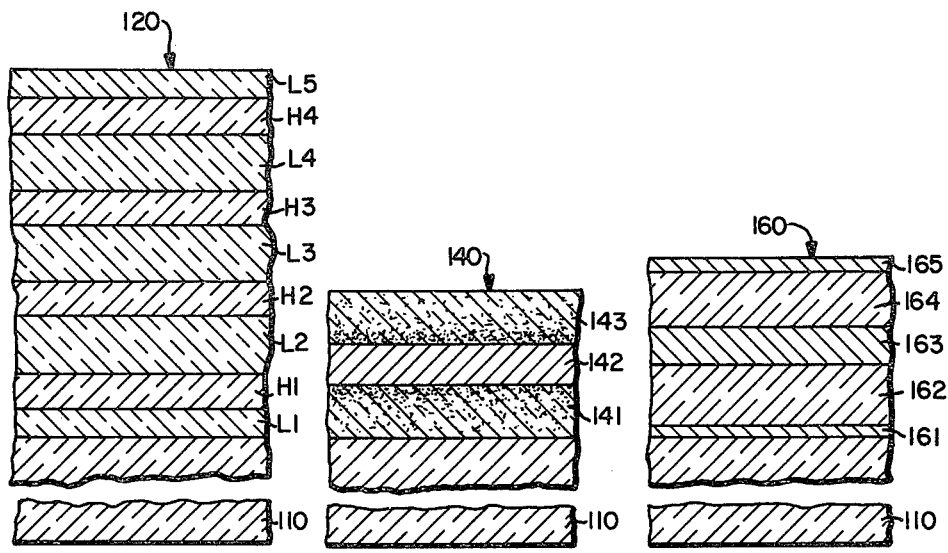
FIG.—3A  FIG.—3B  FIG.—3C
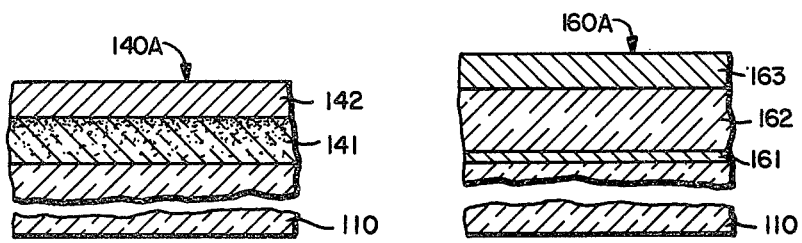
FIG.—3D  FIG.—3E

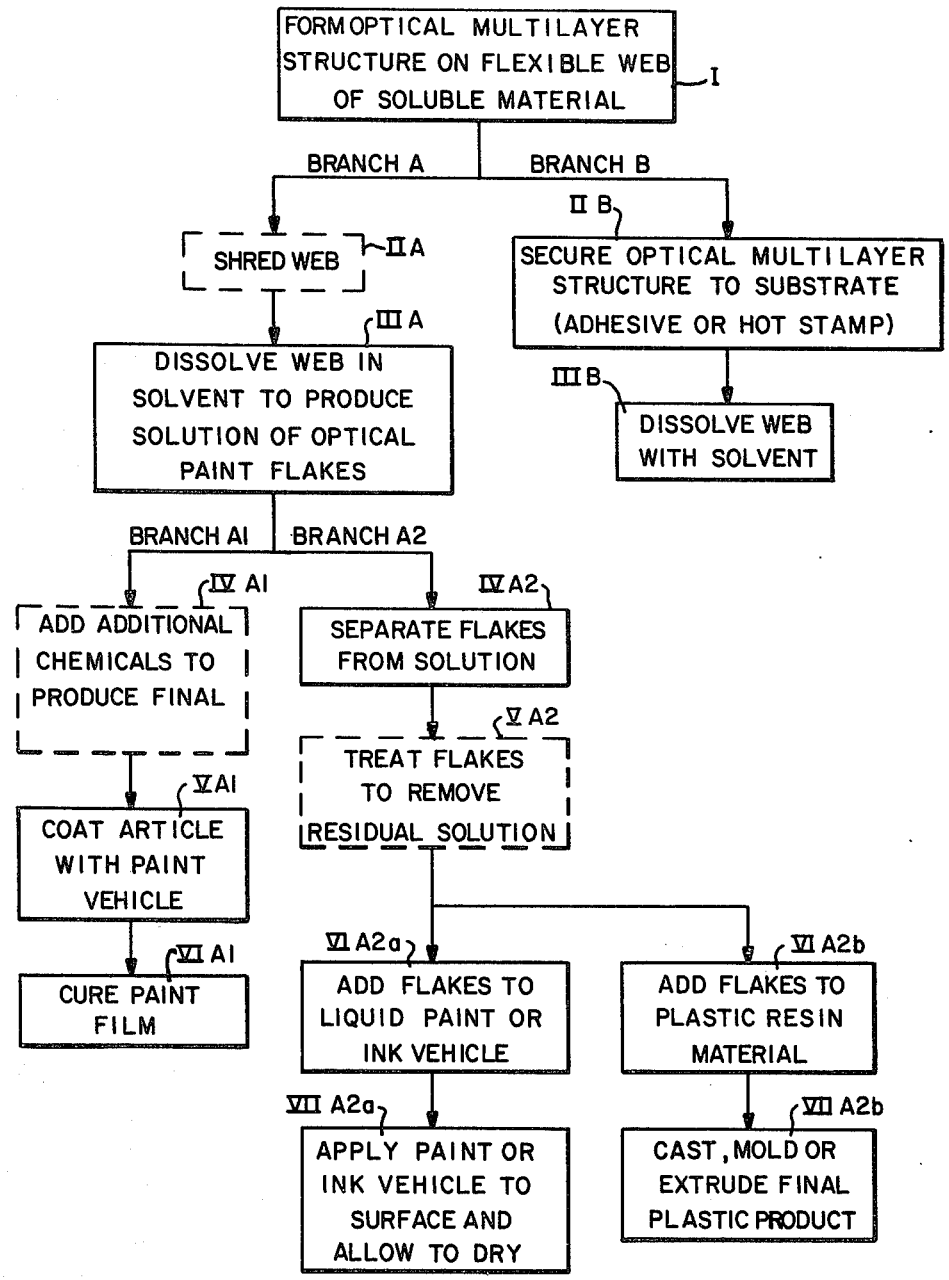
FIG.—4

ARTICLE AND METHOD FOR FORMING THIN FILM FLAKES AND COATINGS

This is a division of application Ser. No. 108,004 filed Dec. 28, 1979, now abandoned.

This invention relates generally to articles and methods for forming thin film flakes and coatings and, more specifically, to articles and methods for forming thin film flakes and coatings having preselected optical properties.

The optical coating art generally involves the placement of an article to be coated in a vacuum coating chamber and evaporating one or more layers of optical coating material sequentially onto at least one surface of the article. For products which require a high performance optical coating, there is no substitute for direct coating of the article in the vacuum chamber. However, high performance optical coatings are not always required and modestly performing optical coatings are entirely satisfactory for some products. In connection with such product applications it is often inconvenient or impossible to directly apply the optical coating to the article in a vacuum coating chamber. In some instances the manufacture of an article is reluctant to interrupt his manufacturing process to send the article to a specialty optical coating company. In other instances the configuration of the article may make direct coating difficult, the product may be too large to fit into the vacuum chamber, or the material of the substrate on which the optical coating is to be formed may be incompatible with the environment in the vacuum chamber. Finally, the manufacturer of the article may want to selectively coat only a small portion of the article, such as when a decorative ink is to be applied only to a portion of a greeting card.

The known prior art provides no practical approach to forming optical paint flakes or a suspension of optical paint flakes in a paint vehicle wherein the optical paint flakes constitute individual flakes of a previously formed optical coating. Attempts to chip or scrape an optical coating from a substrate generally result in destroying the structure of the coating and this approach is also unsatisfactory from a cost standpoint. Optical paint pigments are available in the form of small platelets of mica on which thin coatings of titanium dioxide and/or iron oxide are formed. While these pigments are capable of providing certain optical paint effects such as selective color reflection, saturated colors are currently not available utilizing that technology and the range of optical coating effects which can be achieved is very limited.

It is known in the art to provide replicated optical coatings by forming an inverted optical coating structure on a rigid master substrate which is first coated with a release agent and then transferring the optical coating to a second substrate. This approach still requires the direct coating of the master substrate in a vacuum chamber. It is also known in the art to provide replicated optical coatings by forming an inverted optical coating on a flexible web of material such as cellulose acetate or polyester coated with a heat activated release agent and then hot stamping the coating onto a substrate. In some instances, the use of the required release agent on the master substrate or carrier web causes a highly stressed optical coating to curl away from the substrate before it can be transferred to the second substrate.

It is an object of this invention to provide improved optical paint and optical paint flakes.

It is a further object of this invention to provide an article which is adapted to be selectively utilized in the production of optical paint, optical paint flakes and replicated optical coatings.

It is a further object of this invention to provide improved methods for producing optical paint and optical paint flakes.

It is a further object of this invention to provide improved methods for forming a replicated optical coating.

One aspect of this invention features an article adapted to be utilized in the production of optical paint, optical paint flakes, and replicated optical coatings. The article comprises of a flexible web and an optical coating formed on one surface of the web. The web has the characteristic of solubility when immersed in a preselected liquid.

In accordance with an other aspect, this invention features an article adapted to be utilized in the production of optical paint and optical paint flakes wherein the optical coating is formed on one surface of a web which is soluble in a preselected liquid and is a symmetrical optical multilayer structure such that the optical performance of the optical coating is the same for radiation incident thereon from both directions. This symmetrical optical multilayer structure may be either a symmetrical stack of transparent dielectric layers or transparent dielectric and semitransparent metallic layers, or it may comprise a pair of optical substructures formed on each side of an opaque layer of reflecting material, the bottom optical substructure being inverted and the top non-inverted.

Another aspect of this invention features an article adapted to be utilized to form an optical coating on a preselected substrate wherein the article comprises a flexible web of preselected material and an optical coating formed in an inverted fashion on one surface of the web. The optical coating is adapted to be secured to the substrate, and the preselected material of the web is adapted to be thereafter separated from the optical coating by dissolution in a preselected material.

Another aspect of this invention features improved method steps for producing a paint having preselected optical properties when applied to a surface. The steps comprise forming an optical coating structure on a flexible web of material which is soluble in predetermined liquid and then immersing the web in a predetermined liquid to dissolve the web and produce a multiplicity of optical paint flakes each having the optical coating structure. An alternative aspect of the invention features additional steps of separating the flakes from the resulting solution and adding the separated flakes to a preselected liquid paint medium.

Another aspect of this invention features a method for forming a replicated optical coating structure on a surface of a substrate which involves the steps of forming an inverted version of the optical coating structure on a flexible web of material, securing at least a portion of the optical coating structure to the surface of the substrate, and then dissolving the flexible web of material from the optical coating structure, leaving the optical coating structure adhered to the substrate surface.

This invention has the advantage of enabling for the first time the production of flakes of an optical coating which can be utilized in substantially replicating the coating and its optical performance by applying a paint medium containing the optical flakes to the surface of an article. This invention also has the advantage of providing an article which can be easily utilized by a manufacturer of an article to replicate an optical coating simply by gluing the optical coating on the flexible web to the surface of the article and then removing the web by dissolution. This avoids the manufacturer having to send his article to another location or company for the application of the optical coating. The invention enables production of dichroic paint utilizing a symmetrical optical multilayer which yields strongly saturated colors. This dichroic paint may be used in decorative coatings, decorative inks and decorative plastics.

This invention also has the advantage of enabling the production of optical coatings which produce either a hot mirror or cold mirror optical performance. Hot and cold mirrors are utilized to separate heat and light in the spectrum of radiation incident thereon. The optical coatings produced by the optical paint in accordance with this invention may readily be used in non-imaging applications of hot and cold mirrors and other edge filter type coatings.

This invention also enables the production of a selective solar absorber paint by utilizing known optical coating structures having a selective solar absorbing characteristic. Such a paint is readily applied to appropriate control surfaces in a passive solar energy system. The thermal emittance characteristics of the paint will generally not be as good as the coating itself since it will be strongly influenced by the infrared absorption spectra of the paint vehicle itself.

Other features and advantages of this invention will be apparent from a consideration of the detailed description set forth below in conjunction with the accompanying drawings.

FIG. 1A is a fragmented elevational view of an article in accordance with this invention adapted to be utilized in the production of optical paint, optical paint flakes, and replicated coatings.

FIG. 1B depicts a solution containing a dispersion of optical paint flakes in accordance with this invention.

FIG. 1C is a fragmented cross-sectional view of an optical paint layer formed on the surface of an article and containing optical paint flakes in accordance with this invention.

FIG. 1D is a fragmented elevational view showing one step in e production of a replicated optical coating in accordance with this invention.

FIG. 1E is a fragmented elevational view of a replicated optical coating in accordance with this invention.

FIGS. 1F and 1G depict the steps of adhering an optical coating to a substrate with a hot stamping process.

FIGS. 2A–2D depict the steps in the formation of a replicated optical coating in accordance with this invention on a curved surface of an article.

FIGS. 3A–3E are fragmented cross-sectional views of alternative exemplary embodiments of articles in accordance with this invention which are adapted to be utilized in the production of optical paint, optical paint flakes, and replicated optical coatings.

FIG. 4 is a process flow chart depicting various sequences of method steps for producing optical paint, optical paint flakes, and replicated optical coatings in accordance with this invention.

FIG. 1A depicts an article 5 in accordance with this invention which is adapted to be utilized in the production of optical paint, optical paint flakes, and replicated optical coatings. Article 5 basically comprises a flexible web 10 and an optical coating 20 formed on a surface 11 of the flexible web and will, for convenience, be called a coated web. As will be discussed in more detail below, optical coating 20 may take various forms depending on the desired optical performance of the optical paint, optical paint flakes, or replicated optical coating to be produced from coated web 5. Flexible web 10 comprises a material which is soluble when immersed in a preselected liquid.

FIGS. 1B and 1C depict the utilization of the coated web 5 of FIG. 1A in the formation of optical paint for application to the surface of an article. For purposes of producing optical paint flakes or optical paint, coated web 5 utilizes a web 10 of a material which is soluble in a predetermined liquid. For example, web 10 may comprise a film of polyvinyl alcohol which is soluble in water. Other web materials which are water soluble and may also be utilized in this application are polyethylene oxide and methyl-hydroxy-propyl cellulose. In addition acrylic plastic materials such as polymethyl methacrylate which are soluble in organic solvents such as acetone or methyl ethyl ketone may be employed. FIG. 1B depicts a dispersion of optical paint flakes 21 in a solution 30. Each of the individual optical paint flakes 21 comprises a small segment of optical coating 20 shown in FIG. 1A. These flakes are formed as optical coating 20 breaks into small pieces when the support of web 10 is removed. The size of the flakes depends upon the stress in optical coating 20, the materials and layer thicknesses and the degree of any agitation or grinding of the syrup-like solution in which they are suspended. The solution 30 comprises a mixture of the chemical substance of web 10 and the solvent in which that material is dissolved. In some instances this resulting solution containing a dispersion of the optical flakes 21 may be utilized directly as an optical paint. In other instances the composition of the paint may be altered by the addition of other chemicals in order to produce a paint of desired characteristics. This invention is not restricted to any particular paint formulation and any formulation which results in a layer of paint sufficiently transparent to permit the optical paint flakes to perform their function can be utilized.

As an alternative to utilizing the solution 30 of the material of the web 10 and the liquid in which web 10 is dissolved directly as a part of the paint vehicle, the optical flakes 21 may be separated from solution 30 and then utilized as optical paint pigments. For example, the separated optical paint flakes can be added to another liquid paint vehicle to form an optical paint of desired characteristics. Another alternative is to incorporate the optical paint flakes in a plastic material which may then be cast, molded or extruded into a final article.

FIG. 1C depicts an optical paint layer 40 applied of the surface of an article 50. Optical paint layer 40 comprises a paint vehicle 41 which generally has a transparent characteristic so that radiation incident on the surface of the paint layer 40 can reach the individual optical flakes 21 dispersed in the paint vehicle 41. As depicted in FIG. 1C the layer of optical paint 40 will generally have one or more layers of optical paint flakes 21 lying near the surface of the paint layer with individual flakes overlapping each other. The concentration of optical paint flakes 21 in paint vehicle 41 will determine the number of layers of flakes and the degree of coverage of the substrate. In the case of opaque flakes, no change in performance will be produced after the substrate surface is fully covered with flakes; but for all dielectric coatings and semitransparent metal-dielectric coatings, increased flake concentration resulting in multiple overlapping layers of flakes may improve performance. The individual flakes will be of a variety of sizes and shapes but will generally lie parallel to each other due to surface tension in the paint vehicle. Generally, the original spectral characteristics of the optical coating 20 formed on web 10 (FIG. 1A) will be retained in the final paint film 40. The final optical characteristics of the paint film 40 will be determined by the optical characteristics of the paint vehicle 41 together with those of the optical paint flakes. Accordingly, color dyes and other materials may be added to the liquid paint vehicle to alter the overall optical performances of paint film 40.

FIGS. 1D and 1E depict the utilization of coated web 5 of FIG. 1A in the formation of a replicated optical coating. FIG. 1D shows coated web 5 cemented with a thin layer of adhesive 55 to surface 51 of another article 50. This structure would generally be produced by putting a small quantity of the adhesive of layer 55 on surface 51 of article 50, laying the coated web 5 on surface 51 with optical coating 20 in contact with the adhesive material of layer 55 and then utilizing a flat plate such as plate 60 to press coated web 5 against the adhesive material to spread it into a uniform thin layer 55. Once the adhesive material 55 has cured, the web 10 may be separated from optical coating 20, leaving optical coating 20 adhered to surface 51 of article 50 as depicted in FIG. 1E.

The dissolution of web 10 from optical coating 20 after it has been cemented to surface 51 can be accomplished in two alternative ways. Dissolution of web 10 can be accomplished by immersing the article 50 in a liquid which dissolves web 10, or the surface of article 50 can be flushed with solvent to gradually dissolve the web 10 away from the optical coating 20.

As depicted in FIG. 1E, optical coating 20 is likely to have a cracked appearance either due to the handling of coated web 5 prior to cementing it to the surface of article 50 or due to the stresses to which optical coating 20 is subjected in the process of being pressed into adhesive layer 55. On the other hand, careful handling of coated web 5, together with careful spreading of the adhesive 55 prior to pressing the coated web 5 into it, may enable a crack-free replicated optical coating 20 to be produced. In general, however, coated web 5 will have its principal utility in non-imaging applications in which the appearance of the final optical coating is immaterial and sufficient optical performance is attainable even with cracks in the coating.

FIGS. 1F and 1G depict the formation of a section 20A of an optical coating on a substrate 50 utilizing a well-known hot stamping process in which a heated die 65 is utilized to press the coating 20 into contact with a plastic surface to cause it to adhere. The soluble web 10 may then be dissolved away, leaving the adhered section of the coating. Additional details of a hot stamping process generally may be found on pages 440–445 of the *Modern Plastics Encyclopedia*, 1979–1980.

FIGS. 2A–2D depict the formation of a replicated optical coating on a curved surface of article 70 utilizing coated web 5. The approach generally involves a matched mold technique in which the article 70 to be coated is one of the molds and the cylindrical mold 80 is the matching mold. Since coated web 5 is flexible it can be bent to conform to the surface of article 70. The process of replicating the optical coating starts with the placement of a layer of an epoxy adhesive 75 or other adhesive material on surface 71 of article 70. Then coated web 5 is placed in contact with the small amount of adhesive 75 and the complimentary mold 80 is utilized to press coated web 5 into conformity with the configuration of surface 71 while simultaneously spreading the adhesive 75 into a uniform thin layer. Thereafter, the adhesive material 75 is cured, the complimentary mold 80 is removed and then web 10 is separated from optical coating 20. Separation of web 10 from optical coating 20 can be performed be dissolving web 10 away from optical coating 20 or by simply peeling it away after the adhesive has cured. These approaches are discussed in more detail above and need not be repeated here.

It should thus be apparent that the coated web 5 depicted in FIG. 1A can be utilized in a variety of ways to produce modestly performing optical coatings. Individual sheets or rolls of coated web 5 depicted in FIG. 1A can be produced. These individual sheets or rolls of the coated web 5 may then be transformed into optical paint to be utilized in coating articles at another facility. The manufacturer of an article which requires a modestly performing optical coating need not interrupt his production process to ship the article to another company for application of the coating. Instead, optical paint containing the optical paint flakes produced from coated web 5 in FIG. 1A may be applied directly by the manufacturer to his own product.

Similarly, coated web 5 can be supplied to manufacturers who wish to provide replicated optical coating such as depicted in FIGS. 1E, 1G and 2D. The individual sheets or rolls of the coated web may be cut or stamped to a desired shape and then utilized in the manner depicted in FIGS. 1D and 1E or FIGS. 2A through 2D to form replicated optical coatings. This approach also avoids having to send the articles to an optical coating facility, thereby making the overall manufacturing of a particular article more efficient and less costly.

FIGS. 3A–3E depict exemplary types of optical coatings which may be utilized as optical coating 20 on coated web 5 in FIG. 1A in order to provide a particular optical performance. FIG. 3A depicts a dielectric stack 120 formed on flexible web 110. Dielectric stack 120 comprises alternate layers of a low refractive index material L1–L5 and a high refractive index material H1–H4. A wide variety of low and high index materials known in the art could be used in this optical multilayer. Exemplary combinations are zinc sulfide with magnesium fluoride and titanium dioxide with silicon dioxide. A variety of other dielectric materials could also be used, such as germanium silicon, indium oxide and silicon monoxide. The design of this dielectric stack may be expressed as follows: $(L/2\ H\ L/2)^4$, where L and H designate a quarterwave optical thickness of the low and high index layers, respectively, such that L/2 represents an eighthwave optical thickness of the low index layer. As depicted in FIG. 3A the resulting dielectric stack starts with a layer of low index material L1 which has an eighthwave optical thickness followed by a quarterwave high index layer and then a quarterwave low index layer comprising two eighthwave layers. By forming the optical multilayer 120 with this design and centered at an optical wavelength of 650 to 670 nanometers, a short wave-pass filter is produced. A short wave-pass filter is also known as a hot mirror since it has high reflectance for wavelengths longer than 600 nanometers and thus readily transmits visible light but reflects incident infrared radiation.

A cold mirror can be produced utilizing the same dielectric stack design centered at a wavelength of about 500 nanometers. An optical coating according to this design will transmit the infrared portion of the spectrum of incident radiation and reflect the visible light incident thereon.

Optical coating 120, when transformed into optical paint chips, can thus be utilized to produce certain types of hot mirrors, cold mirrors, or other selective reflectors. In addition flakes of optical coating 120 could be utilized as dichroic paint flakes, although the reflective colors are unsaturated. Since the optical coating 120 is symmetrical, it can be utilized either in the formation of optical paint flakes or in the formation of replicated optical coatings.

FIGS. 3B and 3D depict optical coatings 140 and 140A which have the property of selective solar absorption. The optical coatings 140 and 140A generally characterize the different approach that is preferably taken in forming an optical coating structure to be utilized in the production of optical paint flakes and an optical coating structure which will be utilized in forming a replicated optical coating. As shown in FIG. 3B optical coating 140 comprises a symmetrical optical multilayer comprising cermet layers 141 and 143 formed on opposite sides of a central layer of reflecting material 142. Each of the cermet layers 141 and 143 have a graded ceramic-to-metal ratio but the grading of layer 141 is the inverse of the grading of layer 143. Thus the percentage of metal in cermet layer 141 is greater at the top portion of the layer adjacent the metal reflecting layer 141 whereas in cermet layer 143 the higher metal ratio portion is the lower portion adjacent reflecting layer 142. It will thus be appreciated that the performance of optical coating 140 is the same regardless of whether radiation is incident on layer 143 or layer 141. This is preferable in the production of optical paint flakes since obviously the optical paint flakes may end up being oriented either right side up or upside down in the final paint film. The utilization of a cermet layer formed on metal reflecting layers to provide selective solar absorption is known. In a co-pending application of H. Gurev entitled SELECTIVE SOLAR ABSORBER AND STRUCTURE INCORPORATING THE SAME, Ser. No. 86,076, filed on Oct. 18, 1979, exemplary materials and approaches to forming cermet layers which may be utilized as layers 141 and 142 are set forth. Portions of the Gurev application dealing with formation of cermet layers are incorporated herein by reference. The Gurev application also discloses an interference type of optical coating which produces selective solar absorption and which could be used in this application.

Optical coating 140A depicted in FIG. 3D comprises simply a single cermet layer 141 on web 110 with a layer 141 of reflecting metal formed on top of cermet layer 141. Optical coating 140A is thus preferred for use in formation of a replicated optical coating due to the inverted structure thereof. In other words, in the final optical coating formed by cementing optical coating 140A to another surface, the cermet layer will then be exposed to incident radiation.

FIGS. 3C and 3E depict optical coatings 160 and 160A which may be utilized to produce strongly dichroic optical effects. Optical coating 160 is a symmetrical design comprising thin, semi-opaque metal layer 161 formed on web 110 followed in sequence by a dielectric layer 162, a metal reflecting layer 163, another layer of dielectric material 164 and a final thin, semi-opaque metal layer 165. The metal and dielectric layers 161 and 162 form an optical coating substructure which is an inverted version of the optical coating substructure comprising layers 164 and 165. Each of the thin metal layers 161 and 165 comprise a nominal five nanometer thick layer of chromium. Each of the layers 162 and 164 are formed from a dielectric material such as silicon dioxide to a halfwave optical thickness at a particular design wavelength. Metal reflecting layer 163 may comprise a layer of aluminum formed to a thickness of about 300 nanometers. While a layer of reflecting metal of greater thickness could be utilized, it is believed that a thinner layer is preferable to minimize the stress in this layer which, if too great, can cause the optical paint flakes later produced to curl at the edges and degrade the optical performance of the optical paint. A variety of other materials could be utilized in place of those specifically set forth above. For example, instead of using chromium for the thin metal layers 161 and 165 materials such as nickel and Inconel could also be utilized. Instead of silicon dioxide for the dielectric layers 161 and 164 materials such as magnesium fluoride and aluminum oxide could also be used. Finally, instead of aluminium as the metal reflecting layer 163 materials such as gold, copper and silver could be used for this purpose.

Dielectric coating 160A shown in FIG. 3D is similar in design to dielectric 160 in FIG. 3C but without the optical multilayer substructure comprising the layers 164 and 165. Thus the optical coating 160A is preferred for use in forming replicated optical coatings where an inverted optical coating substructure alone is required.

Specific examples of optical coatings having deep green and purple hues, respectively, were made utilizing the design of coating 160 shown in FIG. 3C. The deep green coating was made utilizing a halfwave silicon dioxide layer at a wavelength of 515 nanometers. This produces an optical coating with a fourth order reflectance maxima at 515 nanometers. A narrow band reflectance spike with about ninety percent reflectance at the 515 nanometer wavelength results with nearly zero reflectance at nearby wave lengths. Although second and sixth order reflectance maxima occur in the near infrared region and the short wavelength blue regions, the coating still produces a very saturated green color. Due to the low refractive index (1.46) of the halfwave silicon dioxide layer and its high order, a large amount of color shift occurs with changes in the viewing angle of the coating. At a viewing angle of about 45 degrees, the fourth order peak shifts into the blue region, and the second order peak shifts downscale into the red, leaving a low reflectance in the 515 nanometer green region. Accordingly, the apparent color of the coating changes from a deep green to a purple as the angle of viewing increases.

A second example of optical coating design 160 shown in FIG. 3C was constructed with a silicon dioxide halfwave layer at about 450 nanometers. This coating had a fourth order reflectance peak in the red part of the spectrum and a sixth order peak in the blue part of the spectrum which produced a deep purple color when viewed at normal incidence. When viewed at larger angles, the fourth order peak moved into the green region with low reflectance in the blue and red. This causes the apparent color of the coating to shift from purple to green at large viewing angles. A number of other colors may be produced simply by modifying the design thickness of the halfwave silicon dioxide layer.

The dichroic paint effects of the optical paint chips produced in accordance with this invention can be combined with certain dye colors added to the suspension of these flakes in a paint medium in order to produce other colors with other color-shifting effects. In addition, the dichroic paint flakes produced in accordance with the design of FIG. 3C may be incorporated with other matching or contrasting standard paint pigments to achieve other color effects. The techniques for mixing paint pigments and obtaining various effects thereby are well known in the paint industry and need not be discussed in detail here.

FIG. 4 depicts a sequence of method steps which may be performed in order to produce optical paint, optical paint flakes, and replicated optical coatings in accordance with this invention. In each case, the method generally starts with Step I involving the formation of an optical coating, typically an optical multilayer structure, on a flexible web of soluble material. Exemplary optical coatings were formed on 3 mil thick sheets of water-soluble polyvinyl alcohol resin obtained from the MONO-SOL Division of Chris-Craft Industries, Inc., (407 County Line Road, Gary, Ind. 46403). In particular, type 1-000 film in sheets approximately ten inches square were utilized.

After Step I, the process either follows Branch A, if optical paint or optical paint flakes are to be produced, or Branch B, if a replicated optical coating is to be produced. Consider first the steps in Branch A. Step IIA is an optional step of shredding the flexible web into strips. In an exemplary process, the sheets of polyvinyl alcohol film were chopped into one-quarter-by-one-inch strips in order to reduce the size of the web so that it could be readily dissolved in a smaller container. This step is optional since, obviously, the web can be dissolved in any size container.

The next step, Step IIIA, is to dissolve the web in a predetermined solvent. In an exemplary process, the shredded strips of the web were dissolved in a flask containing fifty cubic centimeters of water at a temperature of 160° F.

After Step IIIA, the process follows either Branch A, if optical paint is to be produced, or Branch B, if optical paint flakes are to be produced. Consider first the steps of Branch A1. The next step, designated Step IVA1 is an optional one of adding additional chemicals to produce a final paint vehicle. In an exemplary process, Step IVA1 involves adding a surfactant material together with a cross-linking resin material and a catalyst. In the exemplary process, two drops of Merpol surfactant were added together with 0.5 grams of Beetle 60 urea resin (from American Cyanamid) to the dissolved web material in the flask. The polyvinyl alcohol film dissolved rapidly in the flask and the overall mixture was stirred at the 160° temperature for about one-half hour. Then the mixture was allowed to cool to room temperature. Thereafter, one drop of Cycat 4040 catalyst was added and the mixture was stirred for fifteen more minutes.

The next step, Step VA1, is to coat an article with the paint vehicle containing the optical flakes. In the exemplary process, the resulting paint solution was painted onto glass plates, paper file cards, wooden tongue depressors, and small metal articles, and the paint coating was allowed to dry for three or four hours.

Step VIA1 involves curing the paint film. For some paint vehicles the paint film cures as it dries and no further processing is necessary. In the exemplary process, the resulting paint films were baked at about 250° F. for 20 minutes. This baking promotes a chemical reaction causing a crosslinking of the polyvinyl acetate resin and the urea resin, producing a resulting film which is generally insoluble. Good adhesion and good coverage of the resulting paint film was obtained on the porous substrates. On glass and metal materials, the adhesion and coverage were not as good but could readily be improved through the use of initial primer coats or different paint formulations.

Consider now Branch A2 involving steps to produce optical paint flakes. Step IVA2 involves separating the optical paint flakes from the solution in which they are dispersed. This can be performed by centrifuging the dispersed flakes. Step VA2 is an optional step of treating the flakes to remove any residual solution. This step need not be performed if the residual solution on the flakes is not detrimental to performance of the final product. This step can be accomplished simply by washing the polyvinyl alcohol resin or other solution off of the optical paint flakes and then drying the flakes either at room temperature or by heating.

Having collected the optical paint flakes, they can now be added to another liquid paint or ink vehicle as Step VIA2a, or the flakes may be added to a plastic resin material as in Step VIA2b. Following Step VIA2a, Step VIIA2a involves applying the paint or ink vehicle to a surface and permitting it to dry. Following Step VIA2b, Step VIIA2b involves molding or extruding a final plastic product containing the paint flakes.

Consider now the steps in Branch B for forming a replicated optical coating. The second step, Step IIB, comprises securing the optical coating to a substrate with an adhesive material or with a hot stamping process. In an exemplary process, a glass plate having dimensions approximately two inches by two inches by 1/16 inch was utilized as the substrate. A few drops of Nordland type 61 UV-cure cement were deposited on one surface of the glass plate. A piece of polyvinyl alcohol web with an optical coating thereon was pressed into the cement with the optical coating side down, and a second glass plate was pressed against the back of the polyvinyl alcohol film to flatten the piece of web and to spread the cement into a thin layer. This part was then subjected to ultraviolet light to cure the cement.

The third step in Branch B, Step IIIB, generally involves the dissolution of the web away from the optical coating. In an exemplary process, the substrate with the optical coating and polyvinyl alcohol film cemented thereto was immersed in boiling water for ten minutes to dissolve the web. A small amount of Merpol surfactant was added to the water to promote dissolution of the film. This approach successfully removed a polyvinyl alcohol film from an optical multilayer coating which involved a top layer of chrome cemented to a glass surface.

The above descriptions of certain articles and methods according to this invention are given by way of example only and it should be understood that numerous modifications could be made therein by persons of ordinary skill in the art without departing from the scope of the invention. It should be understood that a wide variety of types of optical coatings could be employed.

What is claimed is:

1. A collection of optical paint flakes adapted to be added to a liquid medium for producing a predetermined optical response to radiation incident on a surface of a solidified version of said medium, said collection of flakes being produced by forming a symmetrical optical multilayer structure on a flexible web of material which is soluble in at least one predetermined liquid, immersing said flexible web of material with said optical multilayer structure thereon in said predetermined liquid to produce a suspension of individual flakes of said optical multilayer structure in the resulting solution, and separating said flakes from said solution, said symmetrical optical multilayer structure comprising a first optical coating structure formed in an inverted manner on said web, an opaque layer of reflecting material formed on said first optical coating structure, and a second optical coating structure formed in a non-inverted manner on said opaque layer and having the same optical coating design as said first optical coating structure, whereby said flakes have the same optical response to incident radiation regardless of which of said first and second optical coating structures is facing said incident radiation.

2. In a method for producing a paint having preselected optical properties when applied to a surface, the steps of:
   (a) forming an optical coating structure on a flexible web of material which is soluble in a predetermined liquid; and
   (b) immersing said web in said predetermined liquid to dissolve said web and produce a multiplicity of optical paint flakes each having said optical coating structure.

3. The method of claim 2, wherein prior to the step of immersing said web is performed the step of shredding said web into smaller pieces.

4. The method of claim 2, further comprising the steps of:
   (c) separating said flakes from the resulting solution; and
   (d) adding said separated flakes to a preselected liquid paint medium.

5. In a method for producing optical paint flakes adapted to be added to a liquid medium for producing a predetermined optical response to radiation incident on a solidified version of said medium, the steps of:
   (a) forming an optical coating structure on a flexible web of material which is soluble in at least one predetermined liquid;
   (b) immersing said flexible web with said optical coating structure thereon in said predetermined liquid to produce a suspension of individual flakes of said optical coating structure in the resulting solution; and
   (c) separating said individual flakes from said resulting solution.

6. The method of claim 5, further comprising the steps of:
   (d) treating said flakes to remove residual amounts of said resulting solution; and
   (e) drying said treated flakes.

7. In a method for producing thin flakes of material, the steps of:
   (a) forming a thin layer of a preselected material on a web of material which is soluble in a preselected liquid;
   (b) immersing said web in said preselected liquid to produce a suspension of individual flakes of said preselected material in the resulting solution; and
   (c) separating said thin flakes of material from said resulting solution.

* * * * *